March 2, 1971  E. A. JERMAN ET AL  3,566,592

MOWER GUARD

Filed Aug. 13, 1969  2 Sheets-Sheet 1

Emil A. Jerman
Frank E. Marshall
INVENTORS

BY Clarence A. O'Brien
and Harvey B. Jacobson
Attorneys

March 2, 1971  E. A. JERMAN ET AL  3,566,592
MOWER GUARD
Filed Aug. 13, 1969  2 Sheets-Sheet 2
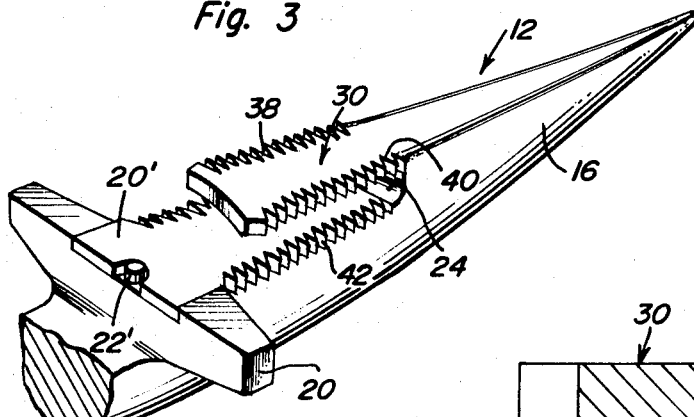
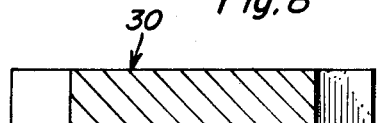
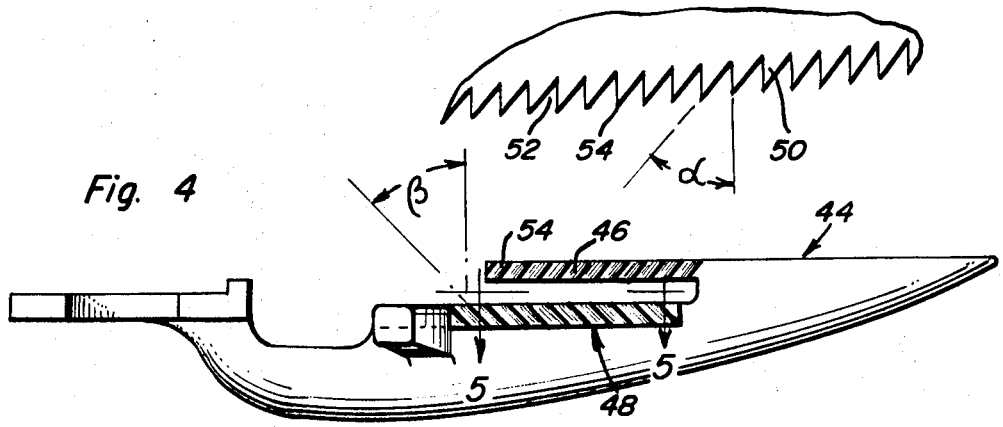
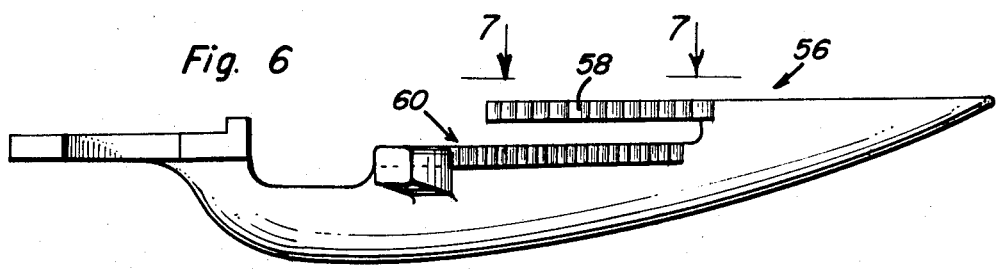
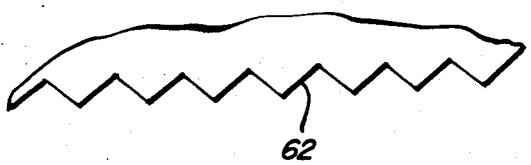
Emil A. Jerman
Frank E. Marshall
INVENTORS

United States Patent Office 3,566,592
Patented Mar. 2, 1971

3,566,592
MOWER GUARD
Emil A. Jerman and Frank E. Marshall, both of
Verdigre, Nebr. 68783
Continuation-in-part of application Ser. No. 665,358,
Sept. 5, 1967. This application Aug. 13, 1969, Ser.
No. 849,797
Int. Cl. A01d 55/10
U.S. Cl. 56—311                                    14 Claims

ABSTRACT OF THE DISCLOSURE

A finger guard for the reciprocating sickle bar of a mower having an upper lip spaced from a lower ledger plate to form a converging slot through which the sickle bar extends. Teeth cut directly onto the side edges of the upper lip trap stalks to facilitate cutting thereof by the triangular blade sections of the sickle bar.

---

This application is a continuation-in-part of my prior copending application, Ser. No. 665,358, filed Sept. 5, 1967 and now abandoned, and relates to cutter guards associated with mowing or cutting machines such as mowers, harvesters, threshers, swathers, and other agricultural machines as well as lawn and trimming devices of all types and purposes which involve a shearing action requiring cooperation between a stationary guard and a reciprocating sickle bar.

An important object of the present invention is to provide a cutter guard of the aforementioned type which eliminates clogging, uneven cuts and reduces wear of the moving parts in the mowing machine. This objective is achieved by a guard construction with critically dimensioned side teeth or serrations. In accordance with the foregoing object, the guard construction of the present invention features an upper lip portion spaced from a lower ledger plate to form a slot through which the sickle bar extends and avoids the use of replaceable upper ledger plates. The side edges of the upper lip are serrated so as to form stalk trapping pockets arranged to hold stalks erect as the cutting edges of the sickle bar reciprocate through the slot in order to form a clean cut.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a perspective view of another form of guard construction.

FIG. 4 is a third form of guard construction in accordance with the present invention.

FIG. 5 is an enlarged partial top plan view as seen from a plane indicated by section line 5—5 in FIG. 4.

FIG. 6 is a fourth form of guard construction in accordance with the present invention.

FIG. 7 is an enlarged partial top plan view as seen from a plane indicated by section line 7—7 in FIG. 6.

FIG. 8 is an enlarged transverse sectional view of the top ledger plate taken substantially through a plane indicated by section line 8—8 in FIG. 1.

Figure 1:
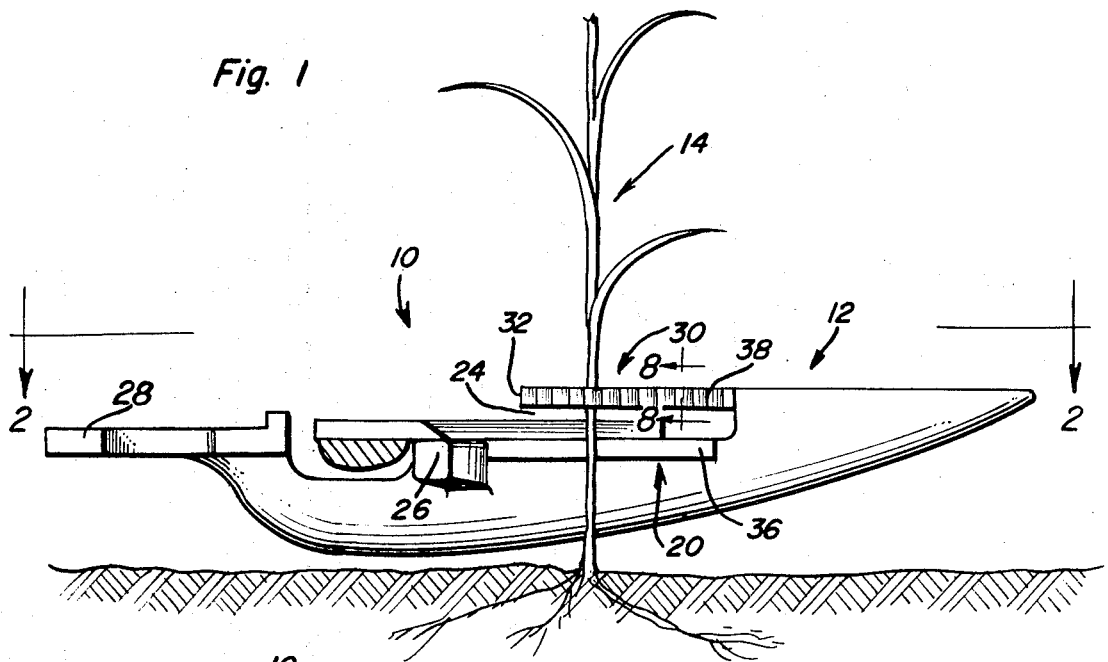
FIG. 1 is a side sectional view through an assembly of guards reciprocably supporting a sickle bar associated with some form of cutter or mowing machine.
Figure 2:
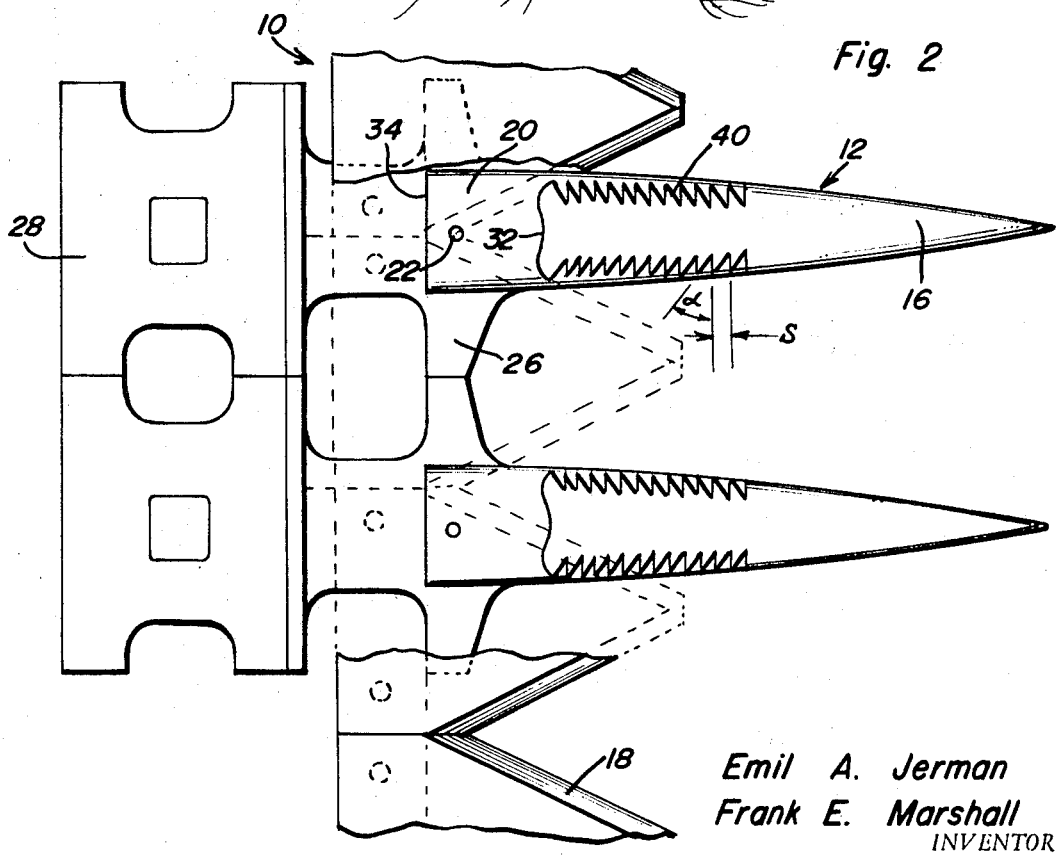
FIG. 2 is a top plan view of the arrangement shown in FIG. 1 as viewed from a plane indicated by section line 2—2 in FIG. 1.

Referring now to the drawings in detail, and initially to FIGS. 1 and 2, it will be observed that a reciprocating sickle bar generally referred to by reference numeral 10 is associated with an assembly of guards 12 in a mowing machine, the guards slidably supporting the sickle bar for rapid reciprocation and cooperating therewith so as to shear or cut the stalks of plants 14 which move between the forward finger portions 16 of the guards as the mowing machine is propelled forwardly. The sickle bar 10 is of the type consisting of a plurality of triangular cutter sections 18 that are slidably supported on a lower ledger plate 20 secured by a hammer rivet 22 to the forward finger portion 16 of the guard or forged as one piece therewith in order to form the lower surface of a slot 24. The finger portions 16 of the guards are spaced from each other by the laterally extending portions 26 and are secured in assembled relation on the frame of the machine by the base portions 28.

The upper surface of the slot 24 is formed by a lip portion 30 which is hardened in the manufacturing process commensurate in strength and surface hardness to the ledger plate 20. If desired, the lip portion could as shown in FIG. 8 provide a flat bottom surface 31 or be transversely curved. The slot so formed converges forwardly as shown in FIG. 1 providing clearance for the reciprocating sickle bar. The upper lip portion also terminates at a rear edge 32 spaced forwardly of the rear edge 34 associated with the lower ledger 20. In the form of the invention illustrated in FIGS. 1 and 2, the side edges 36 of the lower ledger plate 20 are flat. However, the upper lip portion 30 is provided with serrated side edges 38 formed by vertical teeth 40 rearwardly inclined in a horizontal plane at an angle as shown in FIG. 2 in order to form pockets trapping plant stalks and facilitate cutting thereof by the triangular sections 18 of the sickle bar. The teeth 40 are spaced apart a distance (S) of 0.055 inch to 0.090 inch. The lip portion 30 on which the teeth 40 are formed may be of uniform thickness, such as one-quarter inch and having a slight taper in width converging forwardly from 21/32 of an inch at the rear edge to 5/8 of an inch at the forward end of the slot 24. The slot may also converge from a height of 7/16 of an inch to 5/16 of an inch. Also, the main body of each guard may be formed from a suitable material such as cast iron, steel, cast steel, forged steel, forged iron or malleable iron.

FIG. 3 shows the guard 12 as hereinbefore described in connection with FIGS. 1 and 2 wherein the lower ledger plate is replaced by another type of ledger plate 20′. The ledger plate 20′ is of the slip out type held in place by a pin 22′ and instead of being provided with flat sides, is provided with rearwardly inclined teeth 42 similar to the teeth 40 associated with the serrated edges 38 of the upper lip portion 30. The ledger plate 22′ may alternatively be forged integral with the body of the guard as suggested in connection with FIGS. 1 and 2.

FIG. 4 illustrates another form of guard generally referred to by reference numeral 44 which is identical to the guard 12 hereinbefore described in connection with FIGS. 1–3 except for the serrated side edges 46 of the lip portion and the serrated side edges of the lower ledger plate 48. While the teeth 50 associated with the serrated side edges 46 of the lip portion are rearwardly inclined by a horizontal angle α of between 6° to 14° as more clearly seen in FIG. 5, in order to form stalk trapping pockets 52, the vertical edges 54 of the teeth are also inclined rearwardly by a vertical angle β of between 15° and 45° in a downward direction opposite to the inclination of the teeth edges associated with the serrated side edges of the lower ledger plate 48.

FIGS. 6 and 7 illustrate yet another form of guard 56 which is the same as those previously described except for the serrated side edges 58 of the upper lip portion and the serrated side edges of the lower ledger plate 60. As more clearly seen in FIG. 7, the serrated side edges of both the upper lip portion and the lower ledger plate are formed by V-grooves 62 having equal sides constituting the stalk trapping pockets, the V-grooves being vertical rather than inclined. This latter form of guard is of the all-purpose type. The other forms of guard hereinbefore described may be more suitable for particular types of plants.

From the foregoing description, the construction of the guards in accordance with the present invention will be apparent. Because of the formation of the stalk trapping teeth in the side edges of the upper lip portion, their spacing, and horizontal and vertical inclinations as hereinbefore specified, and the particularly described dimensional and geometrical relationships between the upper lip portion and the other portions of the guard and sickle bar, beneficial results are obtained in connection with high speed mowing machines. For example, there is less clogging of the guard and a cleaner cutting of the stalks. Further, the amount of sickle sharpening is reduced and longer life is obtained for the ledger plate. Also, a finer and more even swath is cut by the mowing machine and there is less wear of the other moving parts of the machine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a mower having a reciprocating sickle bar and a plurality of guards through which said sickle bar extends, each of said guards including a finger body having a slot through which said sickle bar extends with clearance, said slot being formed between an upper lip portion of the body and a ledger plate portion of the body having a rear end, said ledger plate portion slidably supporting the sickle bar, said upper lip portion having side edges that converge forwardly, said side edges of the upper lip portion being integrally formed with teeth rearwardly inclined at a horizontal angle of less than approximately 14°.

2. The combination of claim 1 wherein said ledger plate portion includes side edges formed with serrations.

3. The combination of claim 2 wherein said serrations are vertically inclined by approximately 15° to 45° in opposite directions on the side edges of the upper lip portion and the ledger plate portion respectively.

4. The combination of claim 2 wherein said teeth are rearwardly inclined at a horizontal angle of more than 6°.

5. The combination of claim 4 wherein the teeth are spaced apart a distance between .055 inch and .09 inch.

6. The combination of claim 1 wherein said serrations are formed by vertical V-grooves having equal sides constituting said stalk trapping pockets.

7. The combination of claim 1 wherein said serrations are vertically inclined by approximately 15° to 45°.

8. The combination of claim 1 wherein said teeth are rearwardly inclined at a horizontal angle of more than 6°.

9. The combination of claim 1 wherein the teeth are spaced apart a distance between .055 inch and .09 inch.

10. In a mower having a reciprocating sickle bar and a plurality of guards through which said sickle bar extends, each of said guards including a finger body having a slot through which said sickle bar extends with clearance, said slot being formed between an upper lip portion of the body and a ledger plate portion of the body, said upper lip portion having side edges, said side edges of the upper lip being integrally formed with teeth spaced from each other by a distance of .055 to .09 inch.

11. The combination of claim 10 wherein said ledger plate portion includes side edges formed with serrations.

12. The combination of claim 1 wherein said upper lip portion has a rear edge spaced forwardly of the rear end of the ledger plate portion.

13. The combination of claim 12 wherein said upper lip portion has a transverse curvature between the side edges.

14. The combination of claim 1 wherein said upper lip portion has a transverse curvature between the side edges.

References Cited

UNITED STATES PATENTS

| | | | |
|---|---|---|---|
| 356,357 | 1/1887 | Folliott | 56—310 |
| 1,789,781 | 1/1931 | Seidel | 56—309 |

ROBERT PESHOCK, Primary Examiner